(12) United States Patent
Kim et al.

(10) Patent No.: US 7,153,618 B2
(45) Date of Patent: Dec. 26, 2006

(54) COLOR FILTER TRANSFER FILM AND METHOD OF FABRICATING COLOR FILTER PANEL FOR USE IN LIQUID CRYSTAL DISPLAY DEVICE

(75) Inventors: Sam-Yeoul Kim, Osan-si (KR); Jung-Jae Lee, Gwacheon-si (KR)

(73) Assignee: LG.Philips LCD Co., Ltd., Seoul (KR)

( * ) Notice: Subject to any disclaimer, the term of this patent is extended or adjusted under 35 U.S.C. 154(b) by 347 days.

(21) Appl. No.: 10/788,412

(22) Filed: Mar. 1, 2004

(65) Prior Publication Data

US 2004/0180275 A1 Sep. 16, 2004

(30) Foreign Application Priority Data

Feb. 28, 2003 (KR) .................. 10-2003-0012540

(51) Int. Cl.
*G02B 5/20* (2006.01)
(52) U.S. Cl. .................. 430/7; 430/199; 430/200; 427/162; 427/164; 427/555; 427/596
(58) Field of Classification Search .................. None
See application file for complete search history.

(56) References Cited

U.S. PATENT DOCUMENTS 5,725,989 A * 3/1998 Chang et al. .............. 430/201
6,242,140 B1 * 6/2001 Kwon et al. .............. 430/7
2001/0010884 A1 * 8/2001 Guehler et al. .............. 430/7

OTHER PUBLICATIONS

Seong Taek Lee, Jun Yeob Lee, Mu Hyun Kim, Min Chul Shu, Tae Min Kang, Yun Jin Choi, Joon Young Park, Jang Hyuk Kwon, and Ho Kyoon Chung, A New Patterning Method for Full-Color Polymer Light-Emitting Devices: Laser Induced Thermal Imaging (LITI), SID 02 Digest, 2002, 3M Display Materials Technology Center, St. Paul, MN.

Eran Elizur and Dan Gelbart, Thermal Lithography for Flat Panel Display Manufacturing, SID 02 Digest, 2002, Creo Products, Inc., Burnaby B.C., Canada.

* cited by examiner

*Primary Examiner*—John A. McPherson
(74) *Attorney, Agent, or Firm*—McKenna Long & Aldridge LLP (57) ABSTRACT

A method of forming a color filter substrate of a liquid crystal display device includes forming a black matrix on a substrate; attaching a color filter transfer film to the substrate, wherein the color filter transfer film includes red, green, and blue color filter patterns; irradiating a laser beam to an entirety of the color filter transfer film; removing the color filter transfer film from the substrate after the irradiating so, wherein red, green, and blue color filter patterns remain on the substrate; and curing the red, green, and blue color filter patterns remaining on the substrate.

26 Claims, 12 Drawing Sheets

COLOR FILTER TRANSFER FILM AND METHOD OF FABRICATING COLOR FILTER PANEL FOR USE IN LIQUID CRYSTAL DISPLAY DEVICE

This application claims the benefit of Korean Patent Application No. P2003-0012540, filed on Feb. 28, 2003, which is hereby incorporated by reference for all purposes as if fully set forth herein.

BACKGROUND OF THE INVENTION

1. Field of the Invention

The present invention relates to display devices and methods of fabricating display devices. More particularly, the present invention relates to a color filter panel of a liquid crystal display (LCD) device and a method of fabricating the same using a color filter transfer film.

2. Discussion of the Related Art

Generally, flat panel display devices are thin, light in weight, consume low amounts of power and are, therefore, commonly used as displays for portable electronic devices. Because of their superior resolution and ability to produce high-quality color images, liquid crystal display (LCD) devices are commonly used in laptop computers and desktop computer monitors.

LCD devices generally include an LCD panel having upper and lower substrates supporting opposing electrodes that are spaced apart from each other by liquid crystal material. Active matrix LCDs (AM-LCDs) include thin film transistors (TFTs) and pixel electrodes arranged in a matrix pattern and display high resolution moving images. LCD devices can display desired images by applying voltages, which correspond to externally input image data, to the opposing electrodes. Upon receiving the applied voltages, electric fields are induced within the liquid crystal material. The induced electric field affects an alignment of molecules of the liquid crystal material. Given that liquid crystal molecules exhibit anisotropic optical properties, light transmissivity characteristics of the liquid crystal molecules changes when the alignment of the liquid crystal molecules is affected by an induced electric field. Accordingly, when electric fields are selectively induced within liquid crystal material, angles at which the liquid crystal material refracts incident light is selectively controlled to display an image.

As mentioned above, LCD devices generally include an LCD panel having an upper substrate and a lower substrate separated by a layer of liquid crystal material. The upper substrate (i.e., a color filter substrate) includes a common electrode and a color filter layer while the lower substrate (i.e., an array substrate) includes pixel electrodes and switching elements such as thin film transistors (TFT's).

The color filter layer generally includes red (R), green (G) and blue (B) color filters disposed in a predetermined filter pattern by known means such as pigment dispersion methods, inkjet methods, laser (thermal) transferring methods, or film transferring methods. The pigment dispersion method is capable of producing intricate color filter patterns yielding excellent color reproduction characteristics and is therefore widely used in forming color filter layers. Forming color filter layers by the pigment dispersion method, however, may become excessively complicated as it requires many process steps (e.g., color resist deposition, light exposure, resist development, resist curing, etc.).

Figure 1:
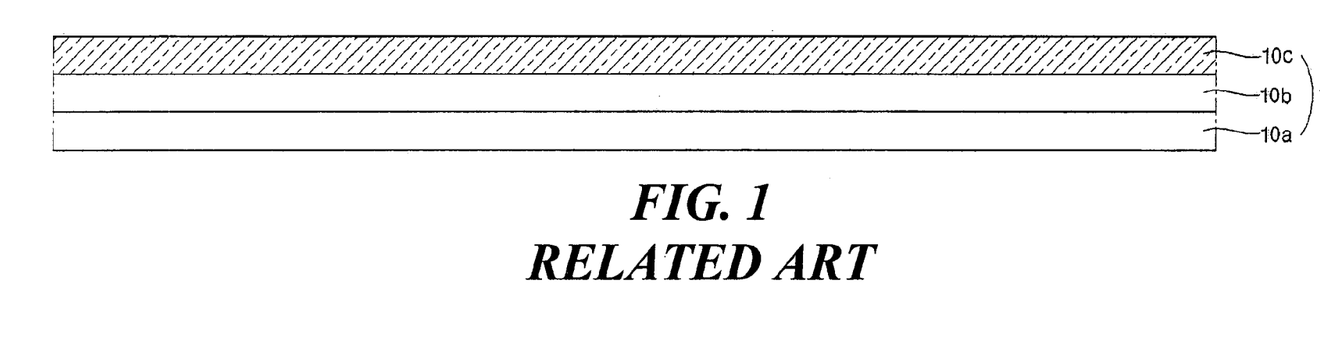
FIG. 1 illustrates a cross sectional view of a related art color filter transfer film.

To overcome the aforementioned problems inherent in the pigment dispersion method, thermal transferring methods have been proposed and developed for use in forming color filter layers. Briefly, in the related art thermal transferring method, a laser is used to selectively irradiate a color filter transfer film. FIG. 1 illustrates a cross sectional view of a related art color filter transfer film.

Referring to FIG. 1, a related art color filter transfer film 10 includes three layers: a base film 10a; a light-to-heat conversion (LTHC) layer 10b; and a color filter layer 10c. The base film 10a is formed of a transparent polymer having suitable light transmissivity properties (e.g., polyester or polyethylene) and supports the LTHC and color filter layers 10b and 10c, respectively. Accordingly, laser light can be efficiently transmitted through the base film 10a to the LTHC layer 10b. The LTHC layer 10b is formed of an organic chemical compound (e.g., carbon black or IR(infrared)-pigment), a metallic material (e.g., aluminum), an oxide metal, or a combination thereof) and converts incident light into thermal energy (i.e., heat). The color filter layer 10c is formed of a resin material having a single color pigmentation (e.g., red, green, or blue). During a thermal transferring process, portions of the color filter layer 10c are transferred onto a color filter substrate as illustrated with respect to FIGS. 2A to 2F.

Figure 2A:
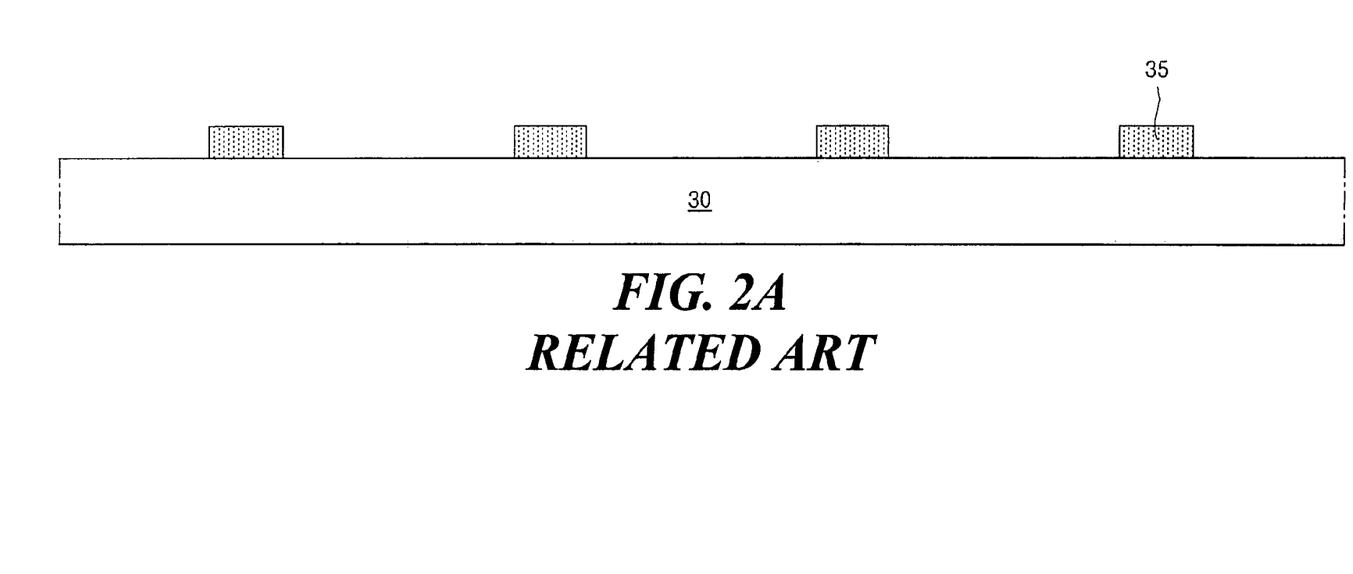
FIGS. 2A to 2F illustrate a related art method of forming a color filter substrate using the related art color filter transfer film.

Referring to FIG. 2A, an opaque layer (e.g., opaque metallic material or a black resin) is first formed on a surface of substrate 30 and is subsequently patterned via known photolithography processes to form a black matrix 35.

Figure 2B:
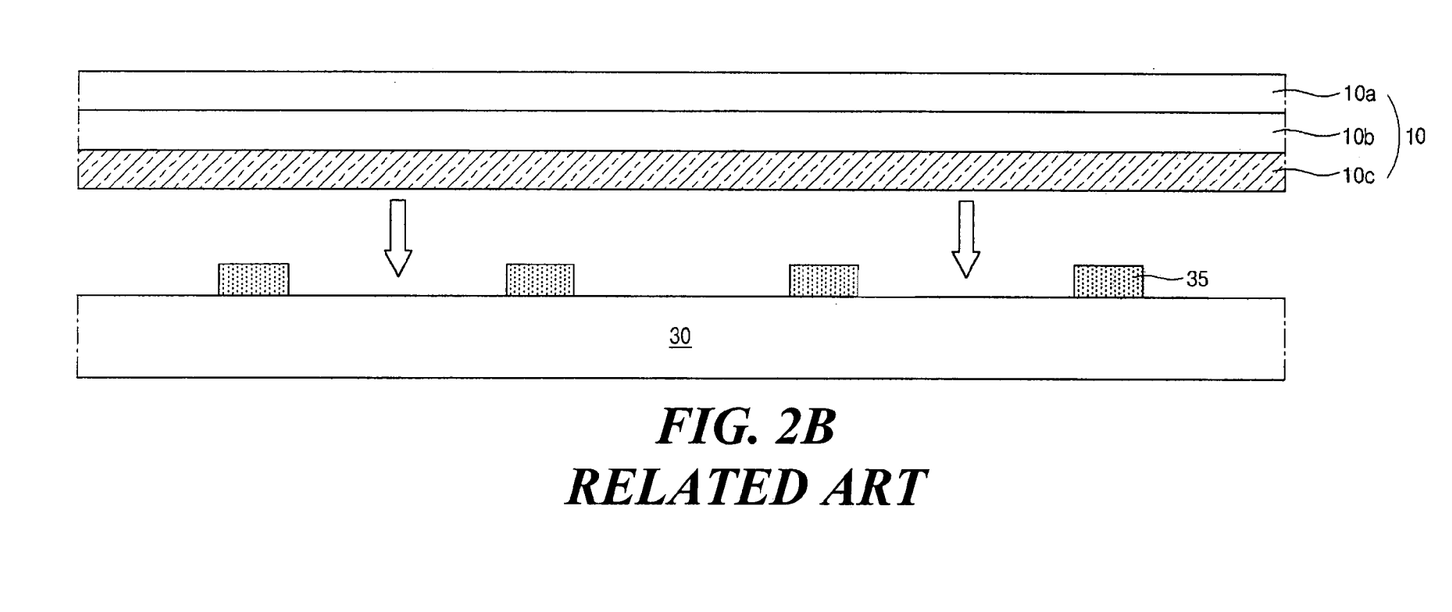

Referring to FIG. 2B, a first color filter transfer film 10 having a structure substantially as described above with respect to FIG. 1, and having a first color, is aligned over the surface of the substrate 30 supporting the black matrix 35. Next, the color filter transfer film 10 is pressed against the substrate 30 and black matrix 35.

Figure 2C:
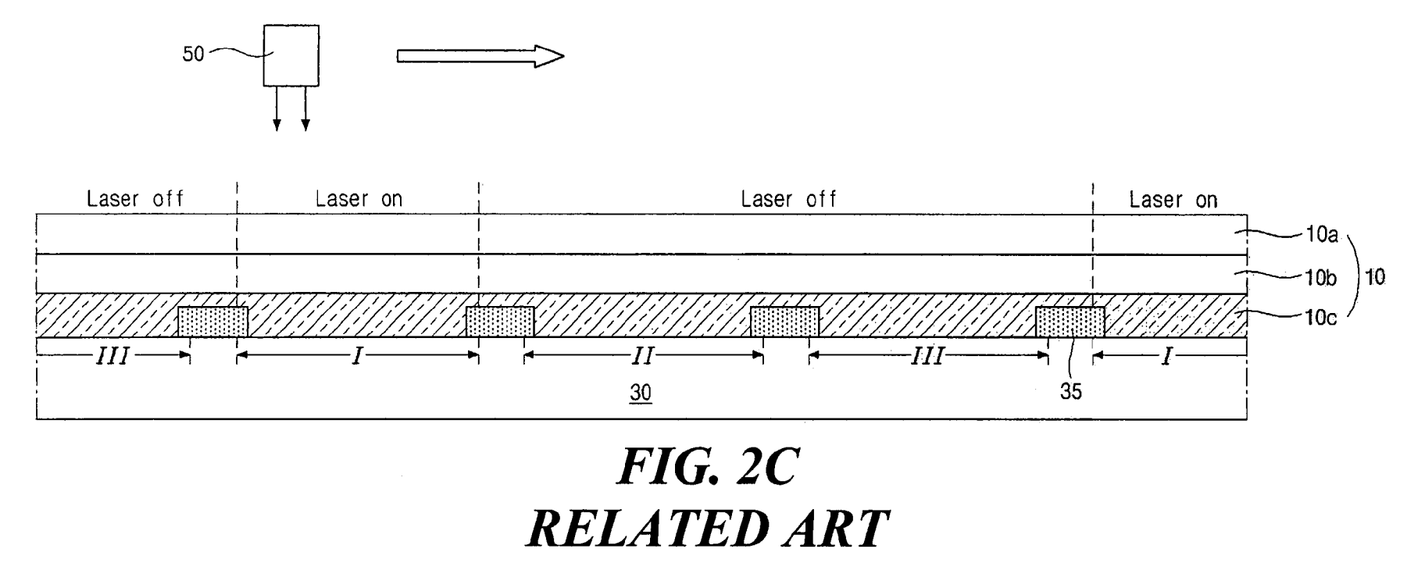

Referring to FIG. 2C, a laser source 50, capable of generating a laser beam, is arranged over the color filter transfer film 10. Thereafter, the laser source 50 is repeatedly turned on and off while the laser source 50 and a substrate stage (not shown) move along predetermined directions, causing the laser source 50 to selectively irradiate predetermined portions of the color filter transfer film 10. Specifically, the laser source 50 is turned on whenever it passes over first regions (I) of the substrate 30 (i.e., where first color filters having a first color pigmentation are to be formed). The laser source 50 is turned off whenever it passes over the black matrix 35 and second and third regions (II) and (III) of the substrate 30, where the first color filters are not to be formed. Accordingly, only areas corresponding to the first regions (I) are irradiated with a laser beam from the laser source 50. While the laser source 50 is turned on, portions of the LTHC layer 10b arranged within the first regions (I) of the substrate 30 absorb the irradiated laser light and covert the irradiated light into heat. The heat converted by the LTHC layer 10b causes adjacent portions of the color filter layer 10c (i.e., portions of the color filter layer 10c arranged within the first regions (I) of the substrate 30), to become transferred onto the substrate 30.

Figure 2D:
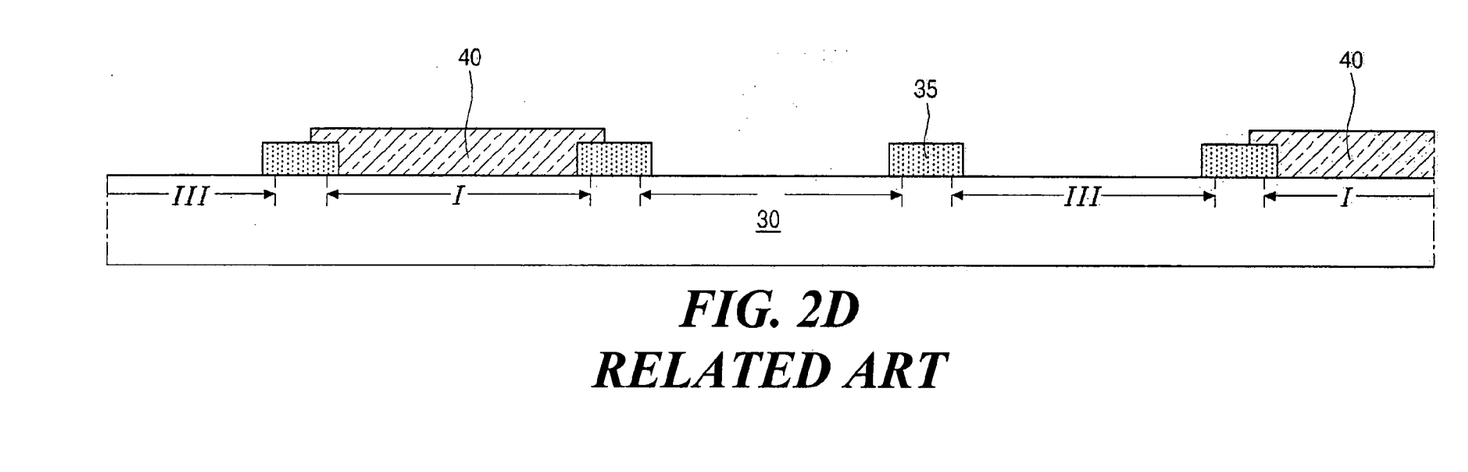

Referring to FIG. 2D, after the laser source 30 irradiates the first regions (I) of the substrate 30, first color filter transfer film 10 is removed, causing first color filters 40 to remain within the first regions (I) on the substrate 30, between the black matrix 35.

Figure 2E:
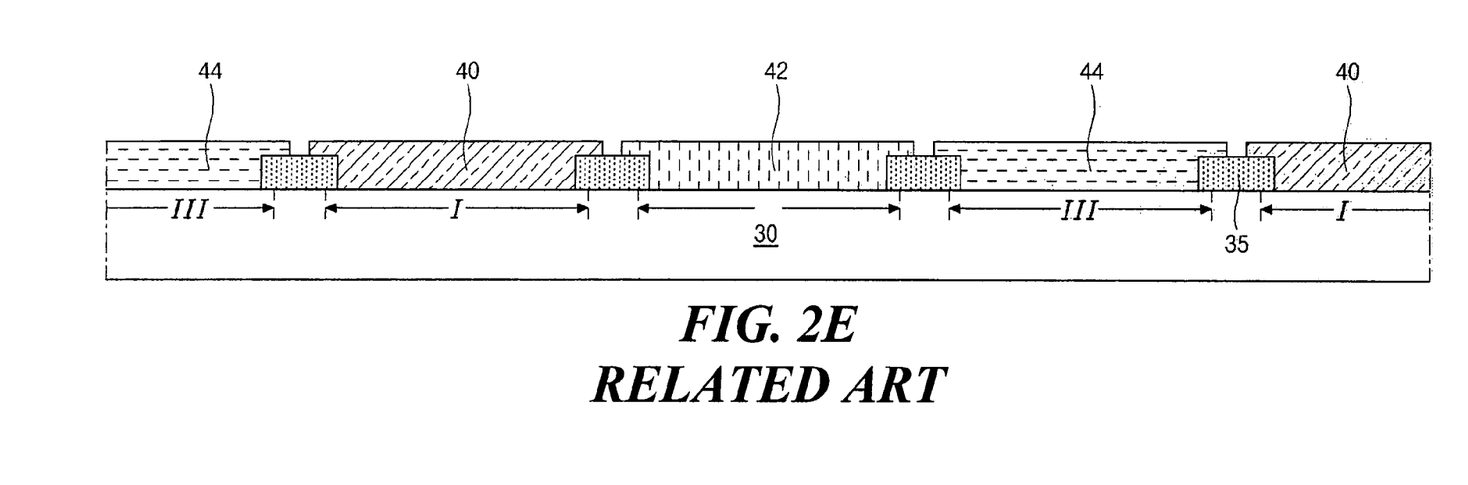

Referring to FIG. 2E, second and third color filters 42 and 44, respectively, are sequentially formed on the substrate 30 in the same manner as the first color filter, illustrated in FIGS. 2B–2D. Thus, second color filters 42 are formed within second regions (II) of the substrate 30 and third color filters 44 are formed within third regions (III) of the substrate 30 such that the first, second, and third color filters 40, 42, and 44 are separated by the black matrix 35. By way of illustration, the first color filter 40 can contain red color pigmentation, and the second and third color filters 42 and 44 can contain green and blue color pigmentations, respectively.

Next, the substrate 30 is heated to a predetermined temperature to cure the resin material forming the newly formed first to third color filters 40, 42, and 44. Alternatively, a curing process can be performed after each of the first to third color filters 40, 42 and 44 are formed on the substrate 30. Curing the substrate 30 between formation of successive color filters is beneficial because it helps to prevent the resin material forming the color filters from intermixing.

Figure 2F:
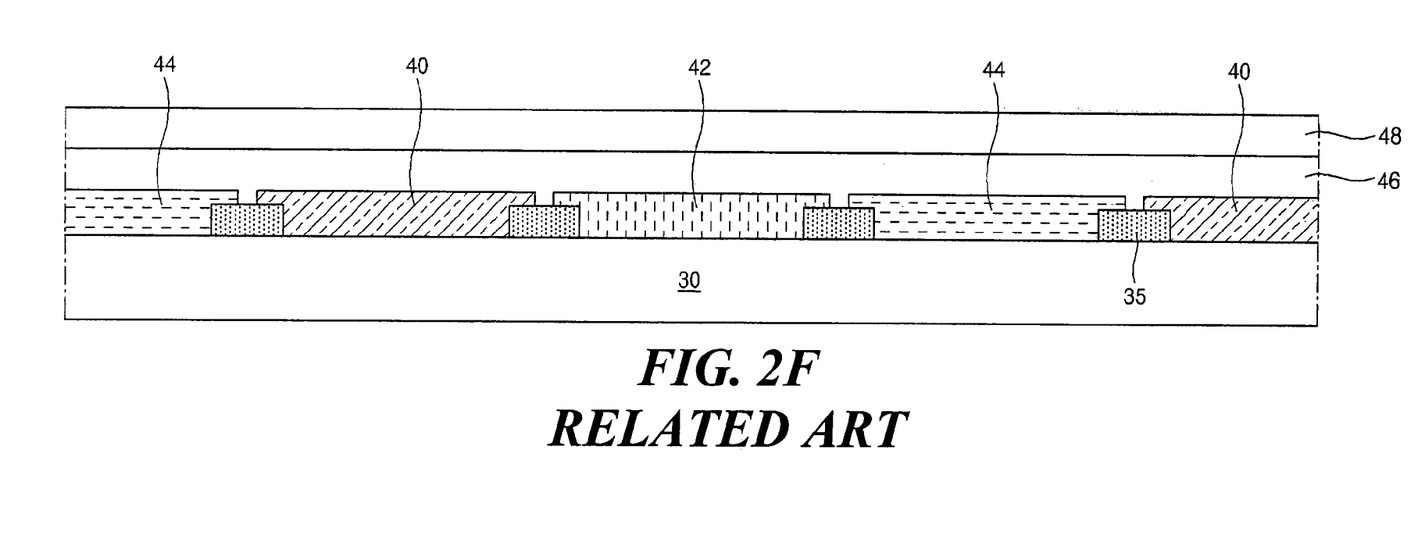

Referring to FIG. 2F, an overcoat layer 46 is formed over the entire substrate 30, covering the color filters and the black matrix 35 after the first, second, and third color filters 40, 42 and 44, have been cured. The overcoat layer 46 protects the underlying color filters 40, 42 and 44 and eliminates step formations generated by the color filters, thereby planarizing the surface of the substrate 30. Next, a transparent common electrode 48 (e.g., formed of indium-tin-oxide (ITO) or indium-zinc-oxide (IZO)) is formed on the overcoat layer 46.

While generally successful, the related art thermal transferring method is not without its disadvantages. For example, the time required to form a complete color filter layer may be unduly long and complicated as red, green, and blue color filter transfer films each have to be separately pressed to the substrate 30, selectively irradiated by the laser source 50, and carefully removed from the substrate 30. Furthermore, defects such as micro bubbles, voids, impurities, etc., may be created between the substrate 30 and the various color filters because of the numerous color filter transfer films that must be repeatedly adhered to and removed from the substrate 30. Such defects may cause the various color filters to delaminate from the substrate 30. Moreover, since only predetermined regions of the color filter transfer film 10 are to be selectively irradiated, the related art thermal transferring method requires that the laser source be frequently turned on and off. Such cycling of the laser source may deleteriously form color filters with rough peripheral edges.

SUMMARY OF THE INVENTION

Accordingly, the present invention is directed to a color filter substrate of a display device such as a liquid crystal display (LCD) device and a method of fabricating the same that substantially obviates one or more of the problems due to limitations and disadvantages of the related art.

An advantage of the present invention provides a method of fabricating a color filter substrate for a display device such as an LCD device that provides excellent color filters without defects.

Another advantage of the present invention provides a method of forming a color filter substrate for a display device such as an LCD device having simplified fabricating processes that increase a manufacturing yield.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a method of forming a color filter substrate may, for example, include forming a black matrix on a substrate; attaching a color filter transfer film to the substrate, wherein the color filter transfer film includes red, green, and blue color filter patterns; irradiating a laser beam to an entirety of the color filter transfer film; removing the color filter transfer film from the substrate after the irradiating so, wherein red, green, and blue color filter patterns remain on the substrate; and curing the red, green, and blue color filter patterns remaining on the substrate.

According to principles of the present invention, a color filter transfer film for use with a color filter transferring method is provided wherein the color filter transfer film may, for example, include a transparent base film; a light-to-heat conversion layer arranged on the transparent base film; and a color filter layer arranged on the light-to-heat conversion layer, wherein the color filter layer includes red, green and blue color filter patterns.

According to principles of the present invention, a method of forming a color filter transfer film is provided wherein the method may, for example, include providing a transparent base film; arranging a light-to-heat conversion film on the transparent base film using one of an organic chemical compound and a metallic material; and sequentially forming red, green, and blue color filter patterns on the light-to-heat conversion film.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference number will be used throughout the drawings to refer to the same or like parts.

Figure 3:
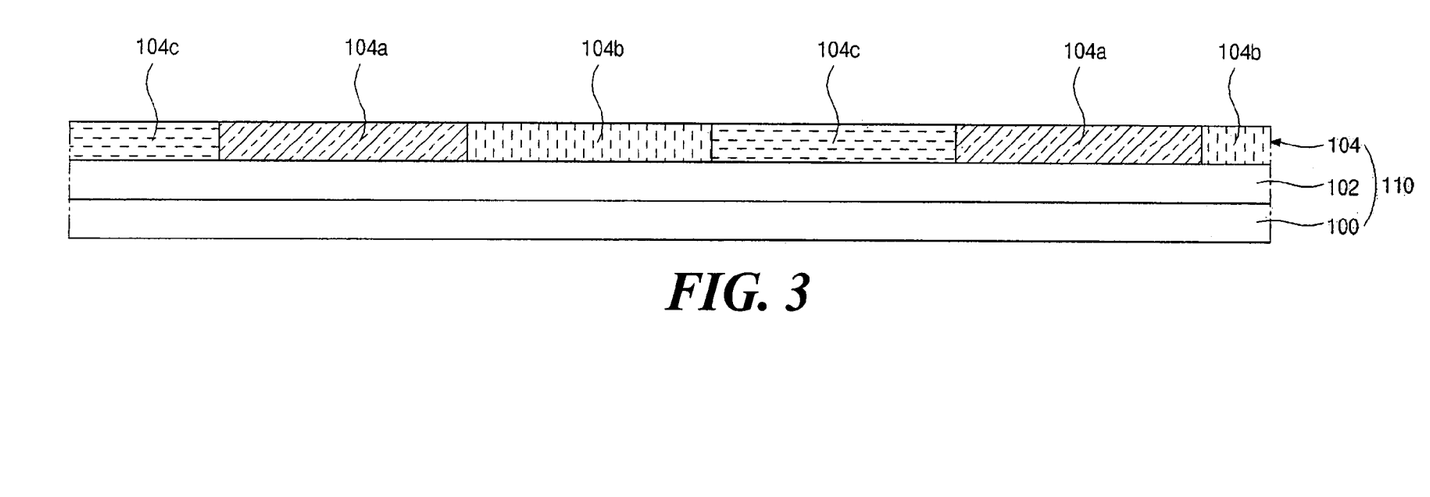
FIG. 3 illustrates a cross sectional view of a color filter transfer film according to principles of the present invention.

FIG. 3 illustrates a cross sectional view of a color filter transfer film according to principles of the present invention.

Referring to FIG. 3, a color filter transfer film 110 according to principles of the present invention may, for example, include a base film 100, a light-to-heat conversion (LTHC) layer 102, and a color filter layer 104. The base film 100 may, for example, include a material having excellent light transmissivity properties (e.g., a transparent polymer material such as polyester, polyethylene, polyacryl, or the like) and may support the LTHC and color filter layers 102 and 104. Accordingly, laser light may be efficiently transmitted through the base film 100 to the LTHC layer 102. The LTHC layer 102 may, for example, include an organic chemical compound (e.g., carbon black or infrared (IR)-pigment), a metallic material (e.g., aluminum), an oxide metal, or a combination thereof) and convert incident laser light into thermal energy (e.g., heat). The color filter layer 104 may, for example, include colored resin material having a plurality of colors arranged on the LTHC layer 102 that can be transferred onto a substrate during a single thermal transferring process. In one aspect of the present invention, the plurality of colors may, for example, include red, green, and blue color filter patterns 104a, 104b, and 104c. In another aspect of the present invention, the red, green, and blue color filter patterns 104a, 104b, and 104c of the color filter layer 104 may be arranged in a striped pattern. In yet another aspect of the present invention, the sequence of red, green, and blue color filter patterns 104a, 104b, and 104c may be repeated over the LTHC layer 102 to form the color filter layer 104. Having described the general structure of the color filter transfer film 110, a method of forming the color filter transfer film 110 will now be, explained in detail with reference to FIGS. 4A–4D.

Figure 4A:
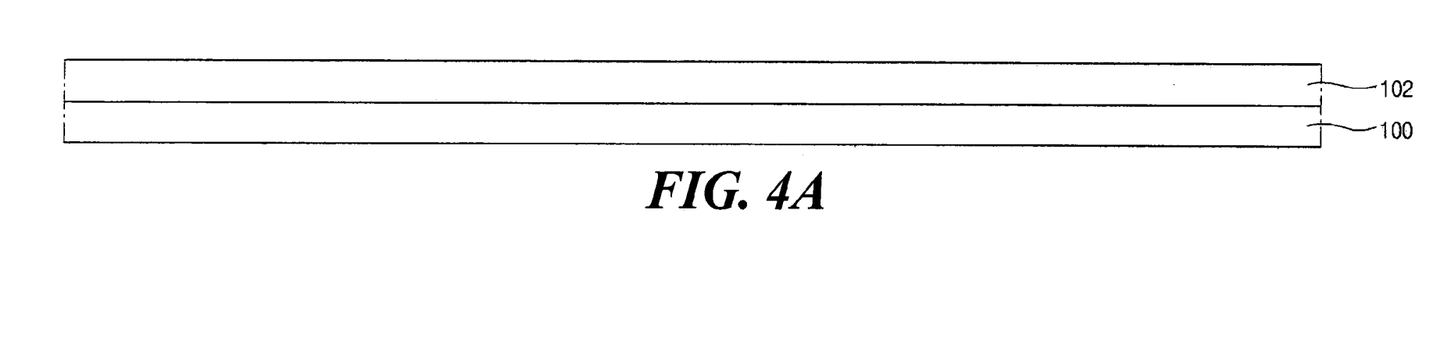
FIGS. 4A to 4D illustrate a method of forming the color filter transfer film according to principles of the present invention.

Referring to FIG. 4A, the aforementioned base film 100 is provided and the LTHC layer 102 is arranged on the base film 100. In one aspect of the present invention, the LTHC layer 102 may, for example, be formed by coating an organic chemical compound or depositing an inorganic material or an oxidized metallic material on the base film 100. If the LTHC layer 102 includes an organic chemical compound, carbon black or an infrared (IR)-pigment may be added to a polymeric resin that does not break down in the presence of high intensity light may be used. If the LTHC layer 102 includes an inorganic material, a metallic material such as aluminum (Al), an oxidized metal such as aluminum oxide, or the like, may be used.

Figure 4B:
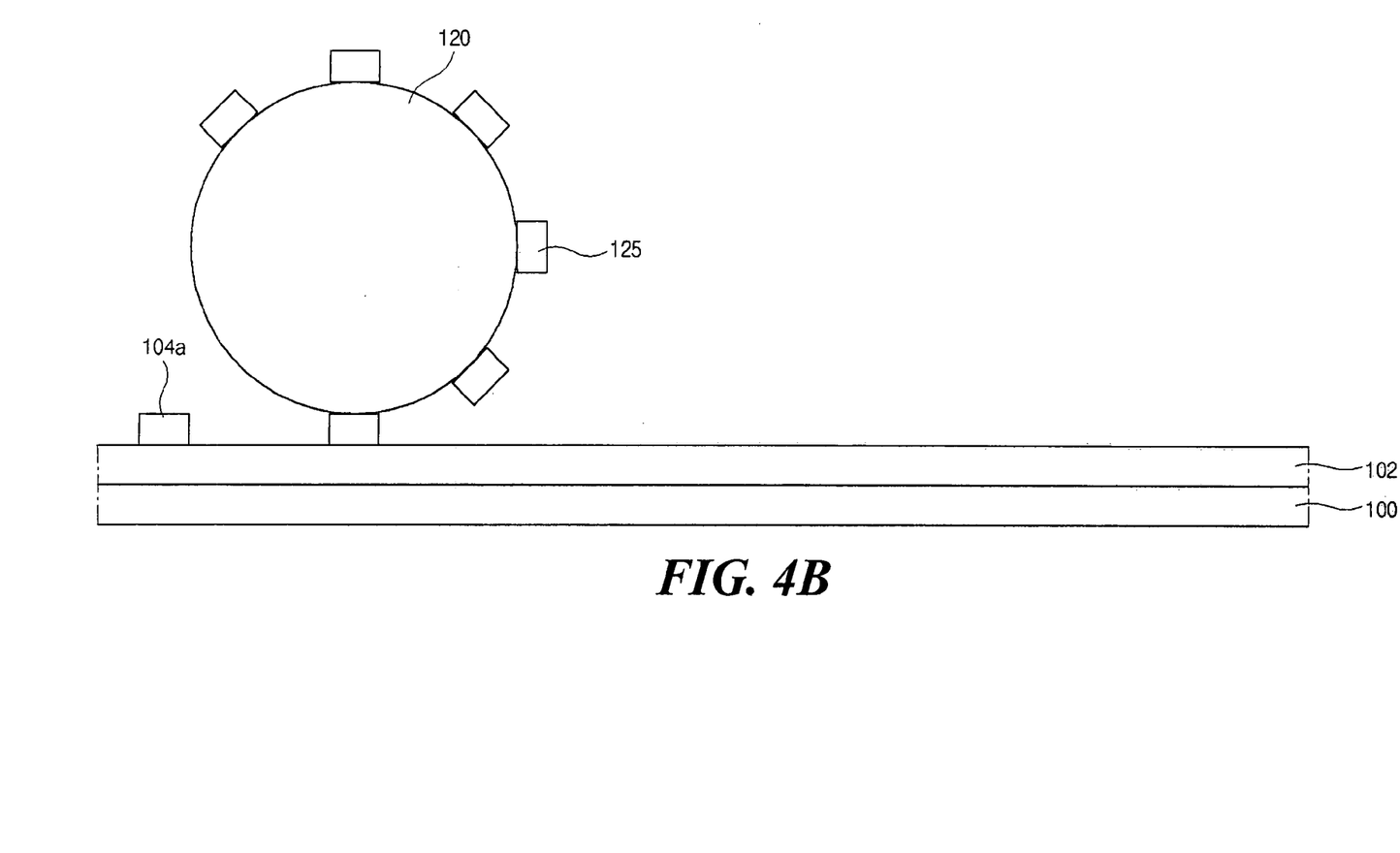
Figure 4C:
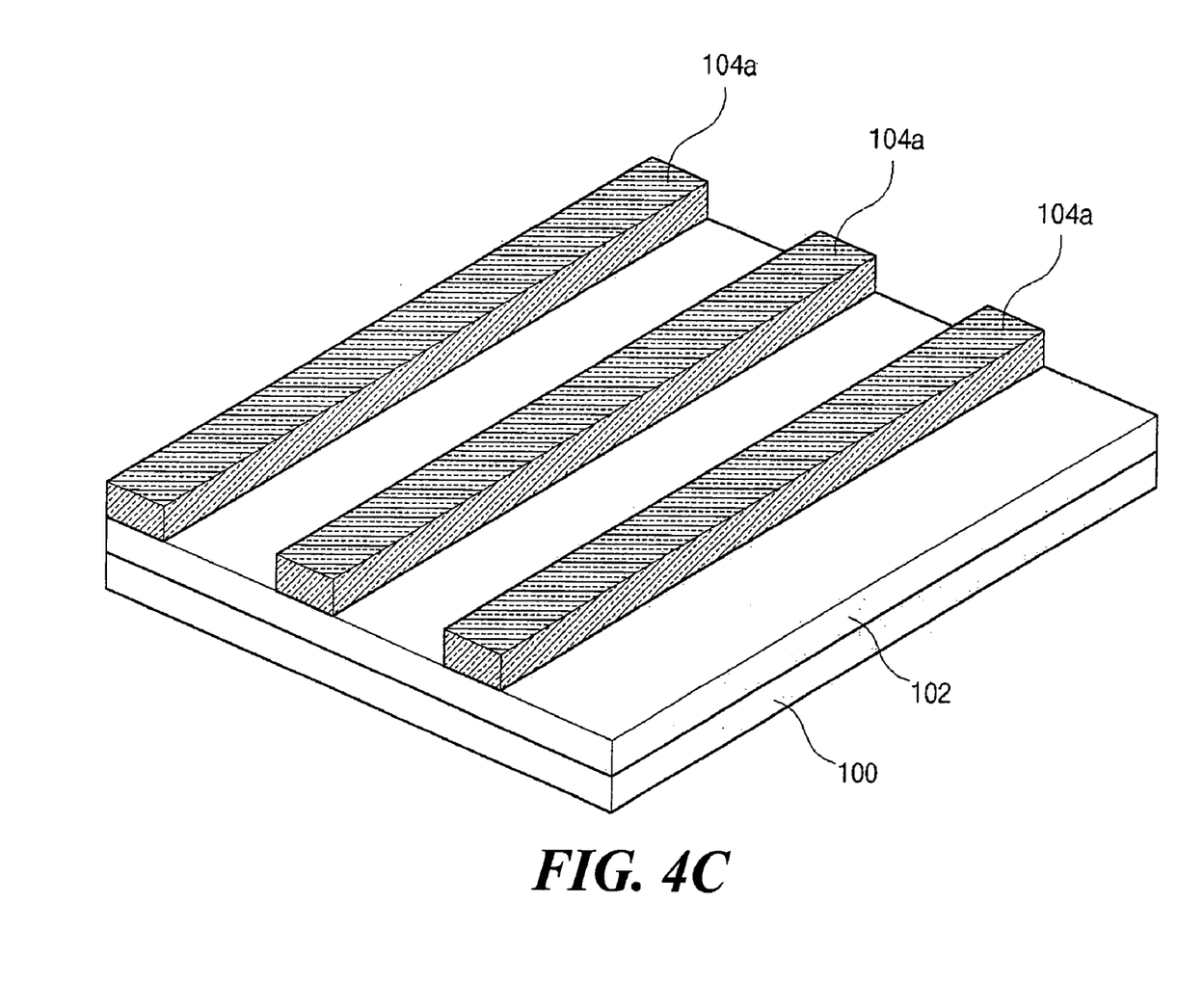
Figure 4D:
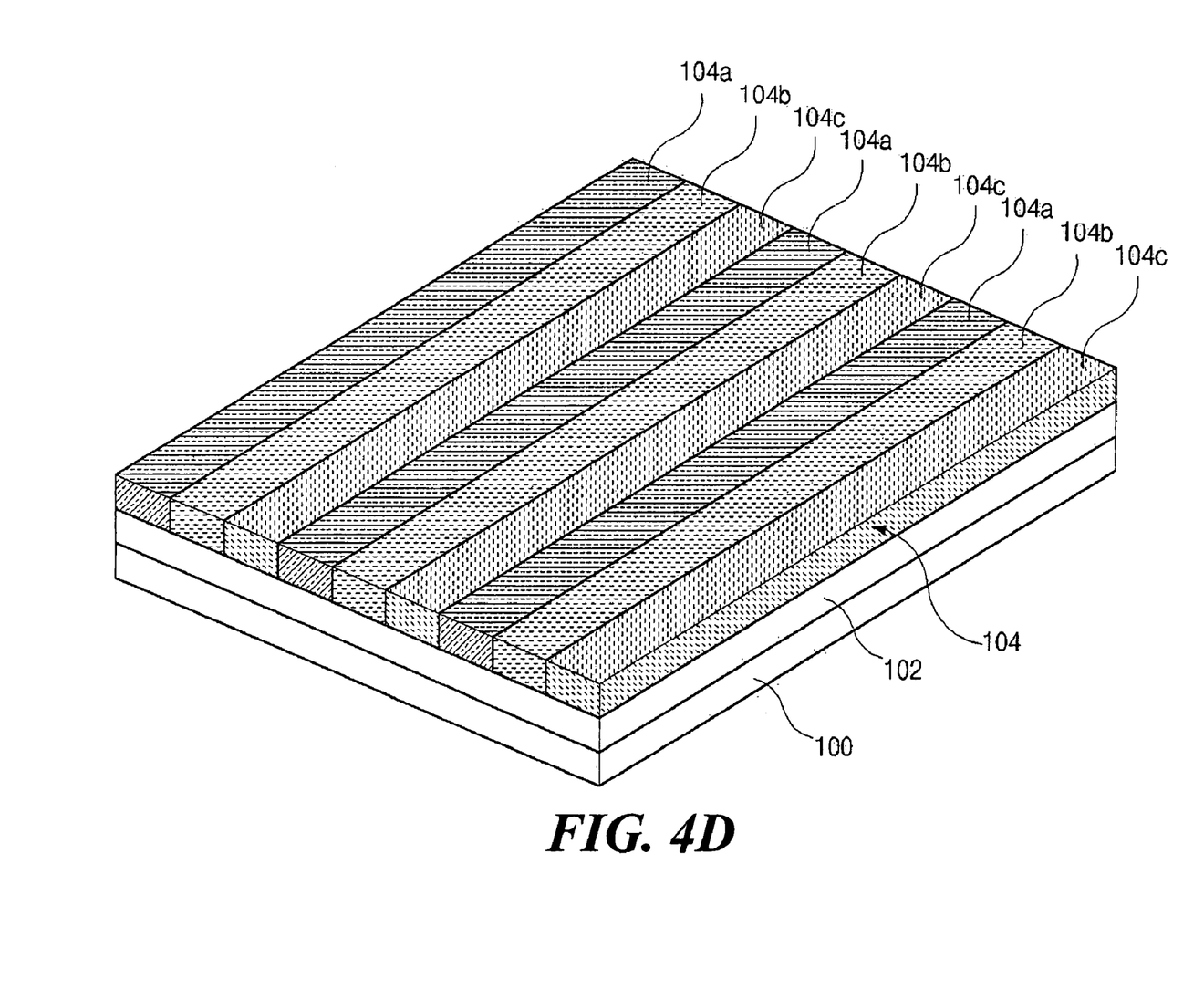

Referring to FIG. 4B, a plurality of first pre-formed color filters 125 containing a first color (e.g., one of red, green, or blue) may be arranged (e.g., printed) on an outer surface of a roller 120. In one aspect of the present invention, the first pre-formed color filters 125 may be stripe-shaped. In another aspect of the present invention, the first pre-formed color filters 125 may be arranged on the outer surface of the roller 120 by first providing a frame (not shown) having a plurality of stripe-shaped grooves, filling color filter material containing the first color pigmentation within the plurality of stripe-shaped grooves, and rolling the roller 120 over the frame such that the color filter material within the stripe-shaped grooves sticks to the outer surface of the roller 120 to become the first pre-formed color filters 125. The roller 120, having the first pre-formed color filters 125 arranged thereon, may then be rolled over the surface of the LTHC layer 102. Upon rolling the roller 120, the first pre-formed color filters 125 become printed onto the LTHC layer 102 as first color filter patterns 104a (as shown in FIGS. 4B and 4C). After the first color filter patterns 104a are printed onto the LTHC layer 102, the process described above may be repeated to form, for example, second and third color filter patterns 104b and 104c, having second and third colors. In one aspect of the present invention, the first, second, and third colors may, for example, include red, green, and blue colors, respectively (as shown FIG. 4D). According to principles of the present invention, the width of each of the first, second, and third color filter patterns 104a, 104b, and 104c may be individually adjusted as desired by adjusting the width of the grooves within frame from which the pre-formed color filters 125 are initially stuck onto the outer surface of the roller 120.

FIGS. 5A to 5E illustrate a method of forming a color filter substrate using the color filter transfer film according to principles of the present invention.

Figure 5A:
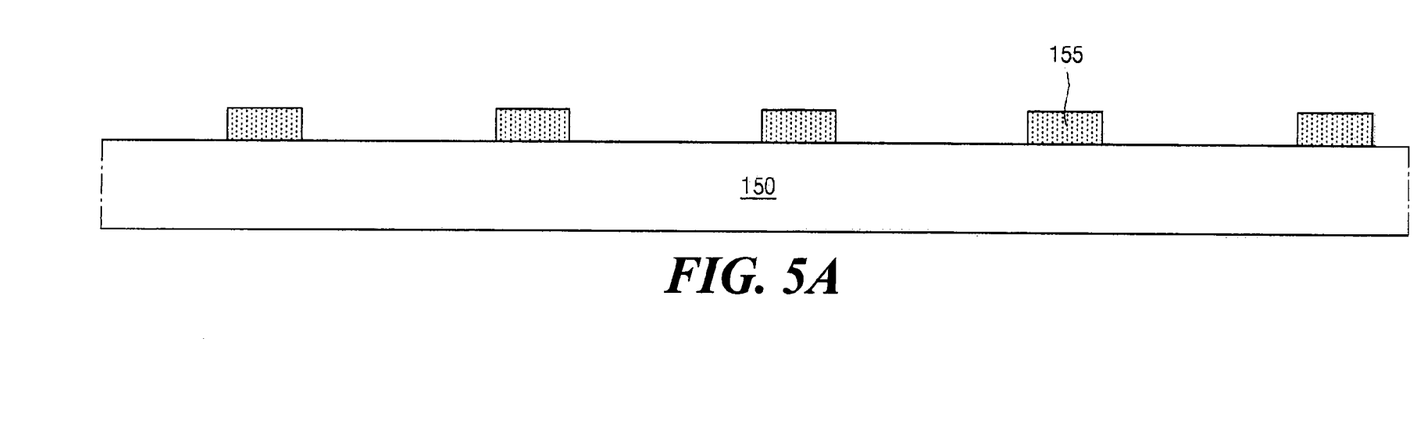
FIGS. 5A to 5E illustrate a method of forming a color filter substrate using the color filter transfer film according to principles of the present invention.

Referring to FIG. 5A, an opaque layer may first be formed on a substrate 150 and patterned using a photolithography process to form a black matrix 155. In one aspect of the present invention, the opaque layer may include an opaque metallic material, such as chromium (Cr), chromium oxide ($CrO_x$), or the like, or a black resin, such as black epoxy resin, or the like. In another aspect of the present invention, the black matrix 155 may be provided as a lattice of intersecting longitudinal and transverse lines that define openings which correspond to pixel areas of a subsequently formed display device such as an LCD device. In yet another aspect of the present invention, the black matrix 155 may have a width ranging from about 15 micrometers to about 30 micrometers. According to principles of the present invention, the black matrix 155 may be arranged between adjacent pixel areas to prevent light from being transmitted, for example, by abnormally functioning liquid crystal material.

Figure 5B:
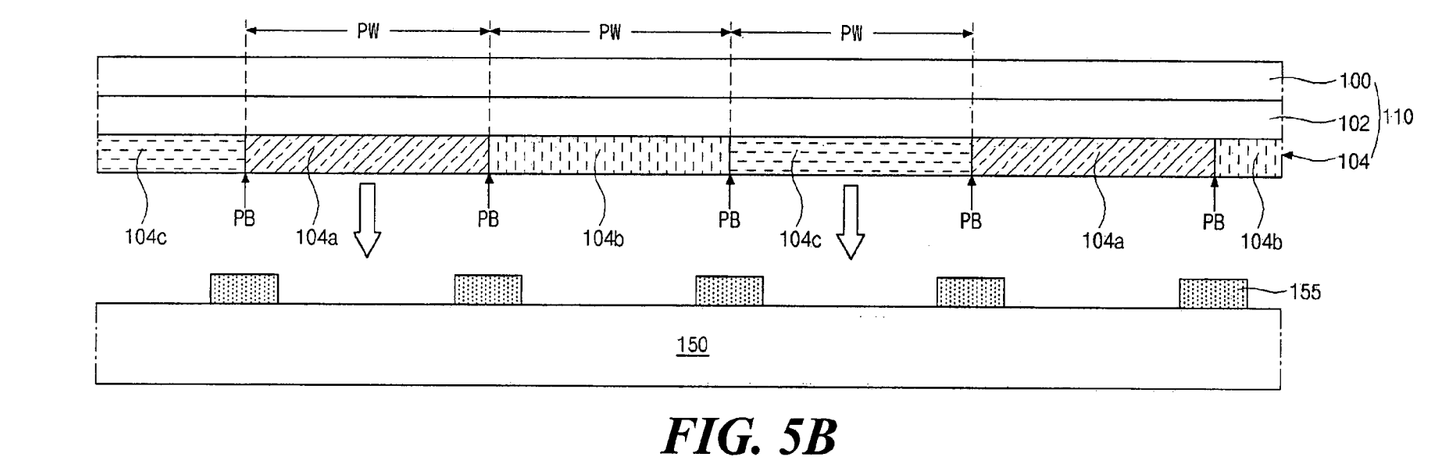

Referring to FIG. 5B, the color filter transfer film 110 described above with respect to FIGS. 3 and 4A–4D is disposed over the substrate 150 having the black matrix 155 formed thereon such that the color filter layer 104 faces the black matrix 155. Next, the color filter transfer film 110 is pressed onto the substrate 150. In one aspect of the present invention, a processing chamber containing the substrate 150 and color filter transfer film 110 may be substantially evacuated before the color filter transfer film 110 is pressed onto the substrate 150. By creating this vacuum, defects such as micro-bubbles may be prevented from forming at the interface between the color filter patterns 104a–104c and portions of the substrate 150 between the black matrix 155. In one aspect of the present invention, a width PW of each of the red, green, and blue color filter patterns 104a, 104b and 104c may be substantially equal to the width of the pixel areas defined by the black matrix 155. Additionally, borders PB of the red, green, and blue color filter patterns 104a–104c are aligned with dimensions of the black matrix 155.

Figure 5C:
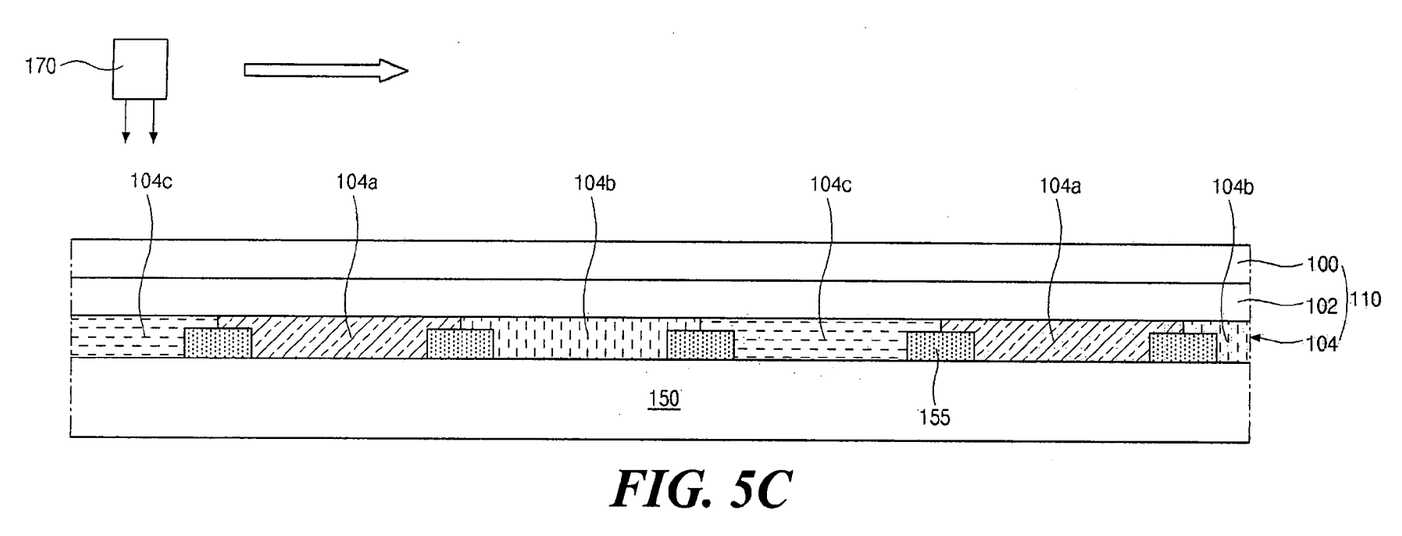

Referring to FIG. 5C, the substrate 150 having the color filter transfer film 110 pressed thereto is arranged on a stage of a laser generating apparatus (not shown). A laser source 170, capable of generating a laser beam, is then arranged over the color filter transfer film 110. Thereafter, the laser source 170 and/or the stage (not shown) may move to cause the laser source 170 to continuously irradiate color filter transfer film 110 with a laser beam.

According to principles of the present invention, the laser source 170 may be continuously turned on as it passes over the color filter transfer film 110. Therefore, edges of the color filters formed on substrate 150 may be prevented from becoming roughened as shown in the related art illustrated of FIG. 2C.

Figure 5D:
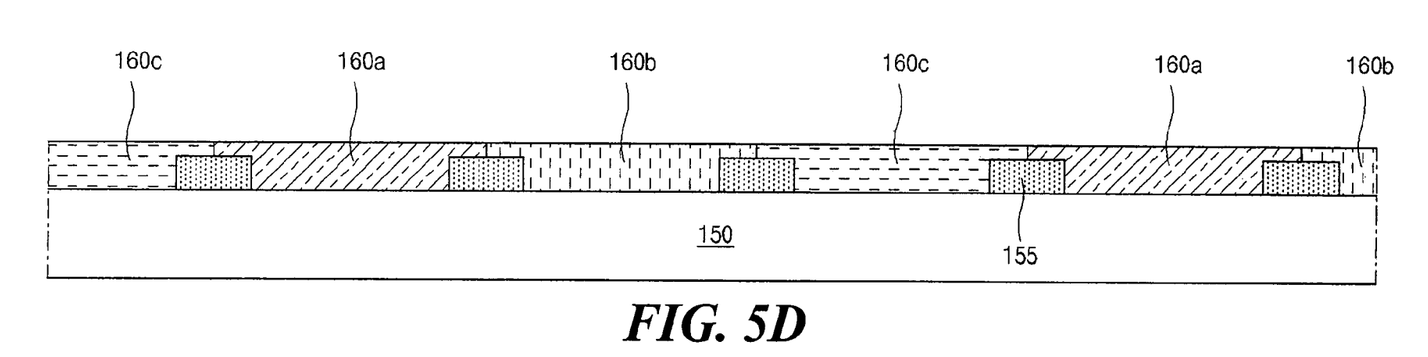

In one aspect of the present invention, the laser source 170 may irradiate an entirety of the color filter transfer film 110 by moving along a first direction and moving the substrate 150 along a second direction (e.g., perpendicular to the first direction). Portions of the color filter layer 104 (e.g., red, green and blue color filter patterns 104a, 104b, and 104c) adjacent the irradiated LTHC layer 102 are transferred onto the substrate 150 to form red, green, and blue color filters 106a, 106b, and 106c, respectively (as shown in FIG. 5D). Next, the substrate 150 is inserted into a curing furnace (not shown) to cure the resin material forming the red, green and blue color filters 106a, 106b, and 106c. In one aspect of the present invention, the red, green and blue color filters 106a, 106b, and 106c may be cured at a temperature of about 200° C. to about 300° C. for a predetermined amount of time. Contrary to the aforementioned related art, the color filter patterns 104a–104c of the present invention may be transferred in a single thermal transferring process, reducing the time required to form the color filters and simplifying the entire thermal transferring process.

Figure 5E:
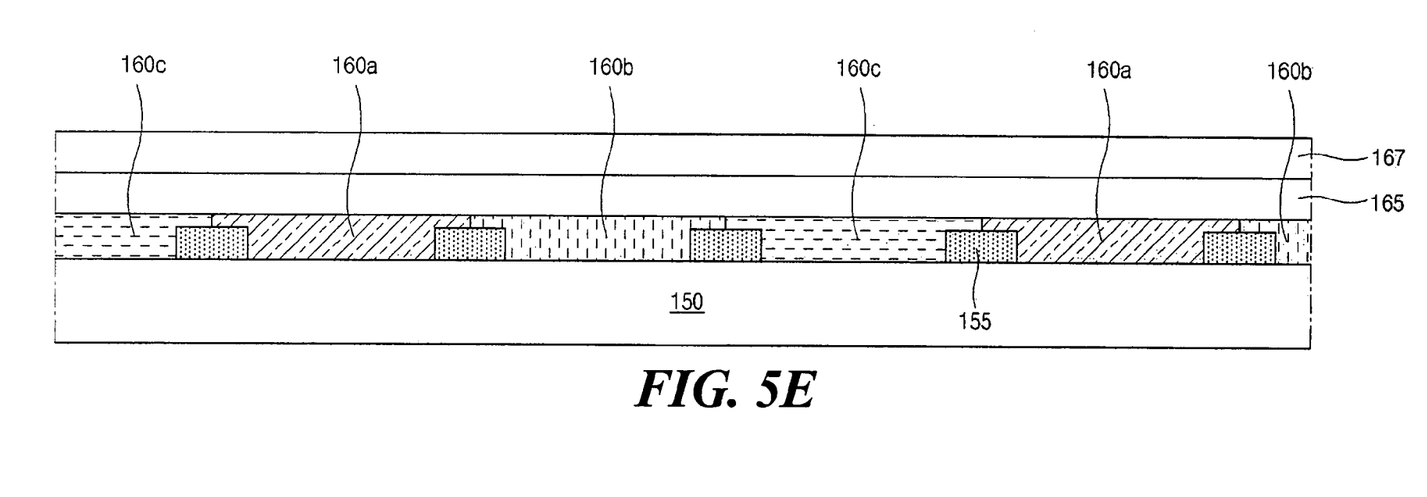

Referring to FIG. 5E, an overcoat layer 165 is formed over the entire substrate 150, covering, protecting, and planarizing an upper surface of the color filters 106a–106c. Next, a common electrode 167 may be formed over the overcoat layer 165. In one aspect of the present invention, the common electrode 167 may include a transparent conductive material such as indium-tin-oxide (ITO), indium-zinc-oxide (IZO), or the like.

According to principles of the present invention, a method of forming the color filters via a thermal transferring method reduces the process time and process steps because only one color filter transfer film that includes pre-formed color filters containing all colors required by the LCD device is used. For example, the color filter transfer film used may include pre-formed color filters having red, green, and blue colors. Because the color filter transfer film includes pre-formed color filters containing all required colors, only one color filter transfer film needs to be pressed to the substrate, thereby eliminating the source of defects (e.g., microbubbles, etc.), simplifying the color filter fabrication process, and increasing a manufacturing yield. Further, because the laser source may be kept on as it scans the substrate, subsequently formed color filters lack the rough edges formed in the related art process.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method of forming a color filter substrate, comprising:
   forming a black matrix on a substrate;
   pressing a color filter transfer film onto the substrate, wherein the color filter transfer film includes color filter patterns having a plurality of colors;
   irradiating the color filter transfer film with a laser beam;
   removing the color filter transfer film from the substrate after irradiating the color filter transfer film, wherein the color filter patterns having the plurality of colors remain on the substrate as color filters having the plurality of colors; and
   curing the color filters remaining on the substrate.

2. The method according to claim 1, wherein the plurality of colors include red, green, and blue colors.

3. The method according to claim 1, wherein the color filter transfer film includes:
   a base film;
   a light-to-heat conversion layer on the base film; and
   a color filter layer on the light-to-heat conversion layer, wherein the color filter layer includes the color filter patterns.

4. The method according to claim 3, wherein the base film includes a transparent material.

5. The method according to claim 4, wherein the transparent material includes a polymeric material selected from a group consisting of polyester, polyethylene and polyacryl.

6. The method according to claim 3, wherein the light-to-heat conversion layer includes a material including one of carbon black, infra-red (IR) pigment, and aluminum.

7. The method according to claim 3, wherein the color filter patterns are stripe-shaped.

8. The method according to claim 1, wherein the pressing includes aligning borders of the color filter patterns in correspondence with the black matrix.

9. The method according to claim 1, wherein the irradiating includes continuously turning a laser source on and irradiating an entirety of the color filter transfer film.

10. The method according to claim 1, wherein curing color filter patterns includes heating the color filter patterns at a temperature from about 200° C. to 300° C.

11. The method according to claim 1, further comprising:
    forming an overcoat layer over color filters after the curing; and
    forming a common electrode over the overcoat layer.

12. A color filter transfer film, comprising:
    a base film;
    a light-to-heat conversion layer on the base film; and
    a color filter layer on the light-to-heat conversion layer, wherein the color filter layer includes color filter patterns having a plurality of colors.

13. The color filter transfer film according to claim 12, wherein the plurality of colors include red, green, and blue colors.

14. The color filter transfer film according to claim 12, wherein the base film includes a transparent material.

15. The color filter transfer film according to claim 14, wherein the transparent material includes a polymeric material selected from a group consisting of polyester, polyethylene and polyacryl.

16. The color filter transfer film according to claim 12, wherein the light-to-heat conversion layer includes an organic chemical compound including one of carbon black and infra-red (IR) pigment.

17. The color filter transfer film according to claim 12, wherein the light-to-heat conversion layer includes an inorganic material including one of aluminum and aluminum oxide.

18. The color filter transfer film according to claim 12, wherein the color filter patterns are stripe-shaped.

19. A method of forming a color filter transfer film, comprising:
    providing a base film;
    forming a light-to-heat conversion layer on the base film;
    forming a color filter layer on the light-to-heat convert film, wherein the color filter layer includes color filter patterns having a plurality of colors.

20. The method according to claim 19, wherein the plurality of colors include red, green, and blue colors.

21. The method according to claim 19, wherein forming the color filter layer includes:
    transferring color filter material having a first color onto an outer surface of a roller as first pre-formed color filters;
    roll-printing the first pre-formed color filters onto the surface of the light-to-heat conversion layer;
    transferring a color filter material having a second color onto an outer surface of a roller as second pre-formed color filters;
    roll-printing the second pre-formed color filters onto the surface of the light-to-heat conversion layer adjacent the first pre-formed color filters;

transferring a color filter material having a third color onto an outer surface of a roller as third pre-formed color filters; and roll-printing the third pre-formed color filters onto the surface of the light-to-heat conversion layer adjacent the second pre-formed color filters.

22. The method according to claim 19, wherein the plurality of colors includes:

a first color that includes a red color;

a second color that includes a green color; and a third color that includes a blue color.

23. The method according to claim 19, wherein the base film is includes a transparent material.

24. The method according to claim 23, wherein the transparent material includes a polymeric material selected from a group consisting of polyester, polyethylene and polyacryl.

25. The method according to claim 19, wherein the light-to-heat conversion layer includes an organic chemical compound including one of carbon black and infra-red (IR) pigment.

26. The method according to claim 19, wherein the light-to-heat conversion layer includes an inorganic material including one of aluminum and aluminum oxide.

* * * * *